US010192362B2

(12) United States Patent
Campbell et al.

(10) Patent No.: US 10,192,362 B2
(45) Date of Patent: Jan. 29, 2019

(54) GENERATING VIRTUAL REALITY AND AUGMENTED REALITY CONTENT FOR A LIVE EVENT

(71) Applicant: GoPro, Inc., San Mateo, CA (US)

(72) Inventors: Scott Patrick Campbell, Belmont, CA (US); Gary Fong, Cupertino, CA (US)

(73) Assignee: GoPro, Inc., San Mateo, CA (US)

( * ) Notice: Subject to any disclaimer, the term of this patent is extended or adjusted under 35 U.S.C. 154(b) by 96 days.

(21) Appl. No.: 15/336,713

(22) Filed: Oct. 27, 2016

(65) Prior Publication Data

US 2018/0122141 A1    May 3, 2018

(51) Int. Cl.
```
G06T 19/00    (2011.01)
G06K 9/32     (2006.01)
G06K 9/00     (2006.01)
G06K 9/62     (2006.01)
G09G 5/00     (2006.01)
```
(52) U.S. Cl.
CPC ........ *G06T 19/006* (2013.01); *G06K 9/00744* (2013.01); *G06K 9/3233* (2013.01); *G06K 9/6215* (2013.01); *G09G 5/006* (2013.01)

(58) Field of Classification Search
CPC ........ G06T 19/00; G06T 19/006; G06T 7/80; G09G 5/00; G09G 5/006; G06F 3/013; G06K 9/52; G06K 9/62; G06K 9/6215; H04N 13/044; H04N 13/0468; H04N 13/0484; H04N 21/21805; H04N 21/2187; G02B 27/0093; A61B 5/6803
See application file for complete search history.

(56) References Cited

U.S. PATENT DOCUMENTS 6,525,731 B1 *    2/2003    Suits ...................... G06T 15/04
                                                           345/421
2015/0235610 A1 *  8/2015   Miller .................... G09G 5/006
                                                           345/633

FOREIGN PATENT DOCUMENTS

WO        2016069137         5/2016
WO     WO 2016069137    *    5/2016    ............. H04N 5/232

* cited by examiner

*Primary Examiner* — Maurice L. McDowell, Jr.
*Assistant Examiner* — Donna J. Ricks
(74) *Attorney, Agent, or Firm* — Sheppard Mullin Richter & Hampton LLP (57) ABSTRACT

A content visualization system generates visual content for a visualization device based on visual content of a live event. The content visualization system collects visual content and source perspective data from visual content sources. The visualization device requests visual content from the content visualization system by providing device perspective data to the content visualization system. The content visualization system generates visual content for the visualization device based on the visual content from the visual content sources, the source perspective data, and the device perspective data. The content visualization system can determine visual content that is relevant to the device perspective by identifying source perspectives that overlap with the device perspective. The content visualization system generates visual content for the visualization device based on the identified visual content. The content visualization system can generate composited or non-composited visual content, based on the similarity of the source perspectives to the device perspective.

18 Claims, 6 Drawing Sheets

GENERATING VIRTUAL REALITY AND AUGMENTED REALITY CONTENT FOR A LIVE EVENT

TECHNICAL FIELD

The disclosure generally relates to the field of virtual reality and more specifically to the rendering of content for augmented reality and/or virtual reality.

BACKGROUND

Conventionally, visual content of a live event is presented to a user from a set of predetermined perspectives that are chosen by the visual content provider. For example, if a concert is being filmed and streamed to viewers who are not physically present, a series of cameras may be positioned in the concert venue and the viewers who are not physically present are presented with the perspective of one of the series of cameras. This perspective presented to the user is conventionally selected from among the set of perspectives by an individual involved in the filming of the concert.

However, conventional methods for capturing and presenting visual content of a live event are not suited to provide content for virtual reality (VR) or augmented reality (AR) visualization devices. Conventional methods for generating visual content to provide an immersive experience for the user of a visualization device require significant processing of the data, which can require significant amounts of time to do. This processing prevents visual content from being streamed live to the visualization device live, since a significant delay would need to occur to process the visual content.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A content visualization system generates visual content for a visualization device, for example, based on visual content of a live event. The content visualization system may collect visual content from visual content sources that capture visual content of the live event. The visual content may include video data, image data, and audio data, and visual content sources can be any system that can capture said visual content (e.g., a video camera). The content visualization system also may collect source perspective data from the visual content sources. The source perspective data describes perspectives of the visual content sources, which are the perspectives of the live event that are captured by the visual content sources. The source perspective data may include data about the position of the visual content sources and data about the direction the visual content sources are pointing.

The visualization device may request visual content from the content visualization system. In some embodiments, the visualization device provides device perspective data to the content visualization system that describes a perspective of the live event to present on the visualization device. The device perspective data may include the position, direction, acceleration, and field of view of the visualization device.

The content visualization system may generate visual content for the visualization device based on the visual content from the visual content sources, the source perspective data, and the device perspective data. The content visualization system can determine visual content that is relevant to the device perspective and generates the visual content for the visualization device based on the relevant visual content. In some example embodiments, the content visualization system determines the relevant visual content by identifying source perspectives that overlap with the device perspective and identifying visual content from visual content sources associated with the identified source perspectives. The content visualization system may generate a model of the source perspectives and the device perspectives to identify source perspectives that overlap with the device perspective.

The content visualization system may generate visual content for the visualization device based on the identified visual content. Visual content for the visualization device may be referred to as "visualization content." The content visualization system can generate composited or non-composited visualization content, based on the similarity of the source perspectives to the device perspective. If a source perspective is very similar to the device perspective, the content visualization system may generate non-composited visualization content, meaning it establishes the visual content associated with the similar source perspective as the visualization content. If none of the source perspectives are sufficiently similar to the device perspective, the visualization system may generate composited visualization content from the identified visual content. To generate composited visualization content, the content visualization system may compute a linear combination of visual content associated with the identified source perspectives.

The content visualization system described herein allows for the presentation of immersive visual content of a live event. Firstly, the linear combinations computed by the content visualization system are sufficiently efficient such that live event visual content can be provided to the visualization device with little or no delay. The linear combinations can be more efficient because composited visualization content are not generated by rendering the visualization content from scratch; instead, the visualization content may be generated using existing visual content. Additionally, the content visualization system may determine whether to simply provide visual content from one visual content source, rather than by generating composited visualization content. This may reduce the amount of computation needed for device perspectives that are similar to a source perspective. Finally, because the content visualization system may generate composited visualization content, fewer visual content sources are needed to provide immersive visual content of a live event.

Example Content Visualization System Environment and Architecture

Figure 1:
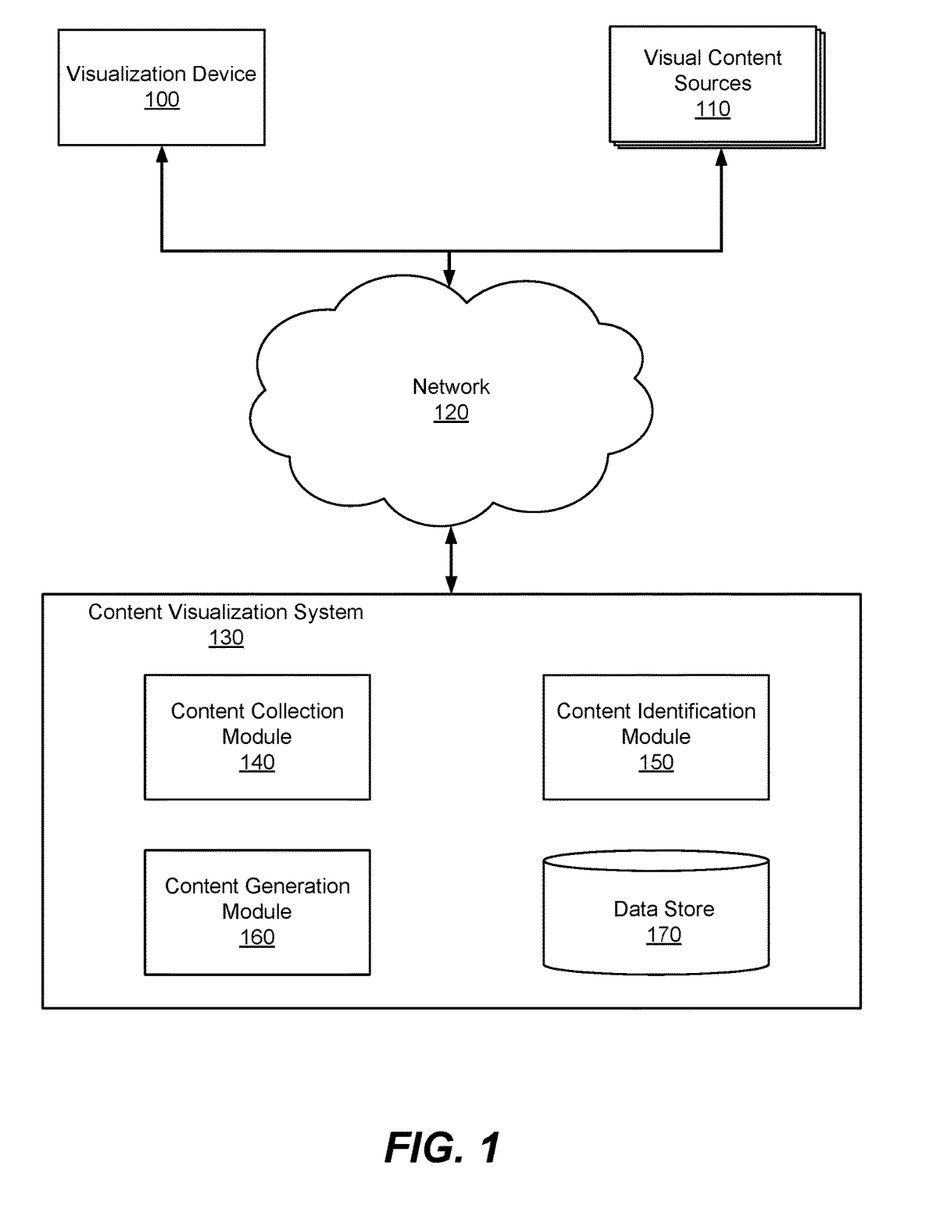
FIG. 1 illustrates a system environment and system architecture for a content visualization system, in accordance with some example embodiments.

Figure (FIG. 1 illustrates a system environment and architecture for a content visualization system, in accordance with some embodiments. The system environment illustrated in FIG. 1 may include a visualization device 100, visual content sources 110, a network 120, and a content visualization system 130. The functionality of the components in FIG. 1 can be performed by additional, fewer, or different modules and the functionality of the modules can be divided between components differently from how it is described below. For example, while FIG. 1 illustrates a single visualization device 100, alternate embodiments may include more than one visualization device 100 in the system environment. Additionally, while FIG. 1 illustrates a content visualization system 130 that communicates with the visualization device 100 through a network 120, some or all of the functionality of the content visualization system 130 may be performed by the visualization device 100 or by devices communicatively coupled to the visualization device 100.

The visualization device 100 may present an immersive virtual reality (VR) and/or augmented reality (AR) visual content to a user. The VR and/or AR configuration may be referenced as an augmented visualization experience (AVE) and accordingly may provide AVE visual content to the user. The visualization device 100 can determine the direction the user is looking and adjust the visual content presented to the user accordingly. In some embodiments, the visualization device 100 stores visual content to present to the user and can determine a perspective of the visual content to present to the user locally. The visualization device 100 can also receive a stream of visual content a live event from the content visualization system 130. In some embodiments, the visualization device 100 processes visual content received from the content visualization system 130 before presenting the visual content to the user. For example, the visualization device 100 may reformat, decrypt, or decompress the visual content.

To receive visual content form the content visualization system 130, the visualization device 100 transmits device perspective data to the content visualization system that describes the perspective of the visual content. The device perspective is a perspective of the live event that corresponds to where the user is looking while using the visualization device. Device perspective data can include the resolution of the display of the visualization device 100, the frame rate of the visualization device 100, the field of view of the visualization device 100, the vertical and horizontal angle of view of the visualization device 100, GPS data, accelerometer data, or electronic compass data. In some embodiments, the visualization device 100 processes the device perspective data before transmitting it to the content visualization system 130. For example, the visualization device 100 may normalize, compress, or encrypt the device perspective data.

The visualization device 100 may receive visual content to present to the user of the visualization device 100 from the content visualization system 130 through the network 120. The visualization device 100 can request visual content from the content visualization system 130 by transmitting the device perspective data to the content visualization system 130. In some example embodiments, the visualization device 100 also may request visual content to be saved in a storage (e.g., memory and/or buffer) to retrieve if the device perspective changes.

The visualization device 100 can contain components that enable the visualization device 100 to perform computations. For example, the visualization device may include a power supply, a data storage unit, a processor, and/or communication and/or power interfaces with external systems. The visualization device 100 can connect to a personal computing device (e.g. a computer, laptop, tablet, and/or phone) to receive visual content. In some example embodiments, the visualization device 100 includes a network interface for communicating with the content visualization system 130 directly.

The visual content sources 110 capture, record, and transmit visual content of a live event. Examples of live events include concerts, plays, TV shows, sports games, lectures, and speeches. The visual content may include image data, video data, or audio data. In some example embodiments, the visual content sources 110 may be cameras that capture video data and audio data of the live event. The visual content sources 110 may transmit the visual content data to the content visualization system 130 in batches or in a continuous stream, and may process the visual content before transmission. For example, the visual content sources 110 may compress, encrypt, format, or filter the visual content before sending it to the content visualization system 130.

Each visual content source 110 may capture visual content of the live event that portrays a perspective of the live event. The visual content sources 110 may generate source perspective data for each visual content source 110 that describes the source perspective of the live event that is captured by each visual content source 110. The source perspective data can include GPS data, accelerometer data, and electronic compass data to describe the position, movement, and direction of the visual content source 110. The source perspective data also may include information describing the field of view of the visual content source 110, such as the horizontal and vertical angle of view or the focal distance of the visual content source 110, or whether the visual content source 110 has a zoom or telephoto option. The source perspective data additionally may include metadata for the visual content, such as the frame rate or the resolution of the visual content.

In some example embodiments, the source perspective data includes information describing the relative positions of the visual content sources 110. For example, the source perspective data may include the differences in position or angle of the visual content sources relative to one another. In some example embodiments, the source perspective data describes the arrangement of the visual content sources. For example, the visual content sources may all be directed at a single area (e.g. a stage, an arena, a playing field) or may be directed away from a single area (e.g. to provide a panoramic view of an area). Additionally, the visual content sources 110 may move, and the source perspective data may describe how the visual content sources 110 move or the position of the visual content sources 110 over time. Visual content from moving visual content sources 110 may be associated with source perspective data that describes the perspective of the visual content over time.

The visualization device 100 and visual content sources 110 may communicate with the content visualization system 130 via the network 120. The network 120 may comprise any combination of local area and wide area networks employing wired or wireless communication links. In one embodiment, the network 120 may use standard communications technologies and protocols. For example, the network 120 may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any format, such as hypertext markup language (HTML) or extensible markup language (XML). In some embodiments, all or some of the communication links of the network 120 may be encrypted.

The content visualization system 130 may generate visual content for the visualization device 100 based on visual content from the visual content sources 110. In the embodiments illustrated by FIG. 1, the content visualization system 130 may include a content collection module 140, a content identification module 150, a content generation module 160, and a data store 170. Alternate embodiments may include more, fewer, or different components from the ones illustrated in FIG. 1, and the functionality of the components may be divided differently from described herein. The modules may be embodied as program code (or referenced as software and comprised of instructions) and/or hardware (e.g., programmed application specific integrated circuits (ASICs) and/or field programmable gate arrays (FPGAs) having program code reference as firmware). The program code may be stored in a storage device and executed by a processor (or controller). An example of a storage device and processor in a computing configuration is described with FIG. 6. It is noted that software comprised of instructions may be packaged as a computer program product and may be executable by a processor, for example, such as one described with FIG. 6.

The content collection module 140 may collect visual content, source perspective data, and device perspective data from the visualization device 100 and the visual content sources 110 and stores the collected data in the data store 170. The content collection module 140 may also process the collected data before storing it. For example, the content collection module 140 may encrypt/decrypt, compress/decompress, normalize, or tag the collected data. In some embodiments, the content collection module 140 normalizes the collected data in accordance with templates stored by the content collection module 140. These templates may include templates that associate visual content with source perspective data from the visual content sources 110 that captured the visual content.

The content identification module 150 identifies visual content from the visual content sources 110 that is relevant to generating visual content that represents the device perspective. To identify the necessary visual content, the content identification module 150 generates a perspectives model of the device perspective and the source perspectives and identifies source perspectives that overlap with the device perspective. Source perspectives overlap with the device perspective when portions of the live event visible from the source perspective are also visible from the device perspective. The content identification module 150 can identify relevant source perspectives based on data collected by the content collection module 140, such as device perspective data, source perspective data, and visual content. For example, the content identification module 150 may determine the field of view of the device perspective based on the visualization device's horizontal and vertical angle of view, and may determine the field of view of the visual content sources 110 based on the horizontal and vertical angle of view of the source perspectives. In some example embodiments, the content identification module 150 may identify relevant source perspectives based on the differences of corresponding values in the device perspective data, source perspective data, and visual content. For example, the content identification module 150 may identify source perspectives that are within some distance of the device perspective, or that the difference of the angle of view of a source perspective and the angle of view of the device perspective is less than some threshold difference.

The content identification module 150 uses the identified source perspectives to determine visual content that is relevant to the device perspective. The content identification module 150 also may determine which portions of the source perspective and the device perspective overlap. For example, the content identification module 150 may identify pixels or regions in the visual content from the visual content source 110 that would be visible from the device perspective and to what portion of the device perspective those pixels/regions correspond.

Figure 2:
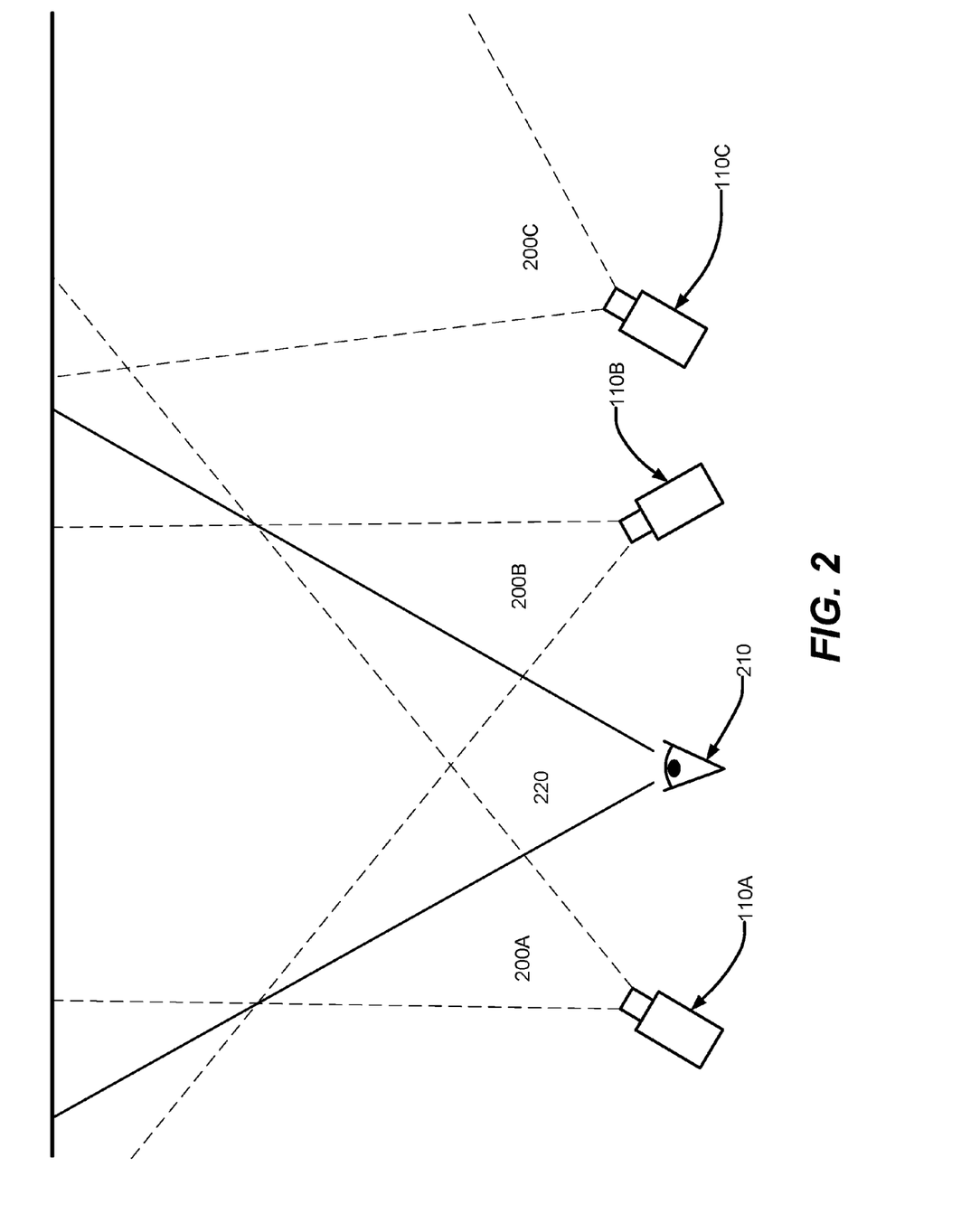
FIG. 2 illustrates the overlap of the device perspective and source perspectives of an example live event, in accordance with some example embodiments.

FIG. 2 illustrates an example of the overlap of the device perspective and source perspectives of an example live event, in accordance with some embodiments. Three visual content sources 110 are illustrated: source 110A, 110B, and 110C (referred to collectively as 110A-C). Each of the visual content sources 110A-C are associated with a source perspective: source perspective 200A, 200B, and 200C (referred to collectively as 200A-C). A visualization device 210 is illustrated, along with a device perspective 220. The illustrated visualization device 210 may represent where the user's eye is located within a visualization device, or the location of the visualization device 210 itself, which can be goggles or a headset worn by the user. The content identification module 150 may generate a perspectives model that models source perspectives 200A-C and device perspective 220, and the content identification module 150 can use the perspectives model to determine that source perspectives 200A and 200B overlap with device perspective 220, but that source perspective 200C does not. Thus, the content identification module 150 would identify visual content from visual content sources 110A and 110B to determine the visual content for the device perspective.

Referring back to FIG. 1, the content generation module 160 generates visual content representing the device perspective to be presented by the visualization device 100. The visual content for the visualization device 100, herein referred to as "visualization content," is generated (to provide for rendering) based on the visual content identified by the content identification module 150. To generate the visualization content, the content generation module 160 compares the device perspective to source perspectives identified by the content identification module 150 and determines a similarity score for each of the identified source perspectives. A similarity score represents the similarity of the device perspective and the corresponding source perspective. For example, if the device perspective is from a position that is very close to the position of a visual content source 110 and is pointed in direction close to the direction of the visual content source 110, then the source perspective for that visual content source 110 may have a high similarity score.

The similarity score for a source perspective can be determined based on source perspective data and device perspective data. In some embodiments, the content generation module 160 uses the source perspective data and the device perspective data to determine the amount that the source perspective and the device perspective overlap, and determine the similarity score based on the amount of overlap. For example, if the source perspective and the device perspective overlap significantly, then the source perspective may have a high similarity score. In some embodiments, the content generation module 160 determines a similarity score by applying a utility function with weightings for different features from the source perspective data and the device perspective data.

The content generation module 160 can use the similarity scores for source perspectives to determine how to generate the visualization content. The content generation module 160 may determine whether to generate non-composited visualization content or composted visualization content. Non-composited visualization content is visual content from one of the visual content sources 110 that is designated as the visualization content, whereas composited visualization content is generated from more than one visual content source 110. The content generation module 160 may use a threshold for the similarity scores to determine whether to establish visual content from a visual content source 110 as the visualization content. For example, if a similarity score meets or exceeds the similarity score threshold, then the content generation module 160 may generate non-composited visualization content. In some embodiments, the content generation module 160 may use thresholds for individual features of the source perspective data and the device perspective data in addition to or instead of the similarity scores. For example, the content generation module 160 may establish a maximum angle threshold, such that, if the angle of direction between a source perspective and the device perspective is less than the maximum angle threshold, the content generation module 160 generates non-composited visualization content using visual content from the source perspective.

The content generation module 160 may determine whether to generate composited or non-composited visualization content based on the rate at which the device perspective is changing. For example, if the device perspective is changing rapidly (e.g. if the user is moving their head rapidly), then the content generation module 160 may be more likely to generate non-composited visualization content. In some embodiments, the content generation module 160 may compare the rate at which the device perspective is change to source perspective data and device perspective data (e.g. the frame rate of the visual content source 110 or the visualization device 100) to determine whether to generate composited or non-composited visualization data.

If the similarity score for a source perspective is sufficiently high, the content generation module 160 may generate the visualization content by establishing the visual content from the corresponding visual content source 110 as the visualization content. In some embodiments, the content generation module 160 selects visual content from a source perspective with the highest similarity score.

If none of the source perspectives have similarity scores that are sufficiently high to generate non-composited visualization content, the content generation module 160 can generate composited visualization content. Composited visualization content is generated from visual content from multiple visual content sources. To generate the composited visualization content, the content generation module 160 generates a linear combination of the source perspectives identified by the content identification module 150. For example, if some portion p of the visualization content overlaps with a portion $p_1$ of a first source perspective and a portion $p_2$ of a second perspective, then a linear combination of these perspectives could be:

$$p=ap_1+bp_2$$

where a and b are coefficients that weight each source perspective. In some embodiments, computing the linear combination of the portions of source perspectives includes performing the linear combination on corresponding pixels in visual content from each of the source perspectives.

The content generation module 160 may generate a linear combination for contiguous portion of the device perspective that overlap with a unique set of source perspectives. In some embodiments, the coefficients of the linear combination are determined based on the amount of overlap of each source perspective with the device perspective. For example, a source perspective that significantly overlaps with the device perspective may be weighted higher than a source perspective that only overlaps a little bit. The coefficients also may be determined based on the position or direction of the device perspective and the source perspectives. For example, if the angle of direction of the device perspective and a source perspective are close, then the coefficient for the source perspective may be high. The coefficients may also be determined based on the similarity scores of the source perspectives or based on the number of source perspectives being combined.

The content generation module 160 may determine the coefficients for a linear combination based on whether the portion of the visualization content corresponding to the linear combination contains the background or the foreground of the device perspective. To adjust the coefficients based on the closeness of what is being represented in the portion of the visualization content, the content generation module 160 can identify whether a portion of the device perspective contains part of the background or part of the foreground. The content generation module 160 may identify the foreground and background of visual content using depth-based image processing, stereoscopic imaging, or 3D processing algorithms. To generate a composite of the background from the identified source perspectives, the content generation module 160 may approximate that the angle at which the background is viewed does not significantly impact visualization content. Thus, if multiple source perspectives cover a portion of the background of the visualization content, the content generation module 160 may select only one of the source perspectives and generate the portion of the visualization content from the visual content of only that one source perspective. Alternately, the content generation module 160 may combine the using a linear combination as described above. Thus, the content generation module 160 can generate the visualization content using linear combinations of portions of the device perspective that overlap with more than one source perspective and portions of the device perspective that overlap with only one source perspective.

Figure 3:
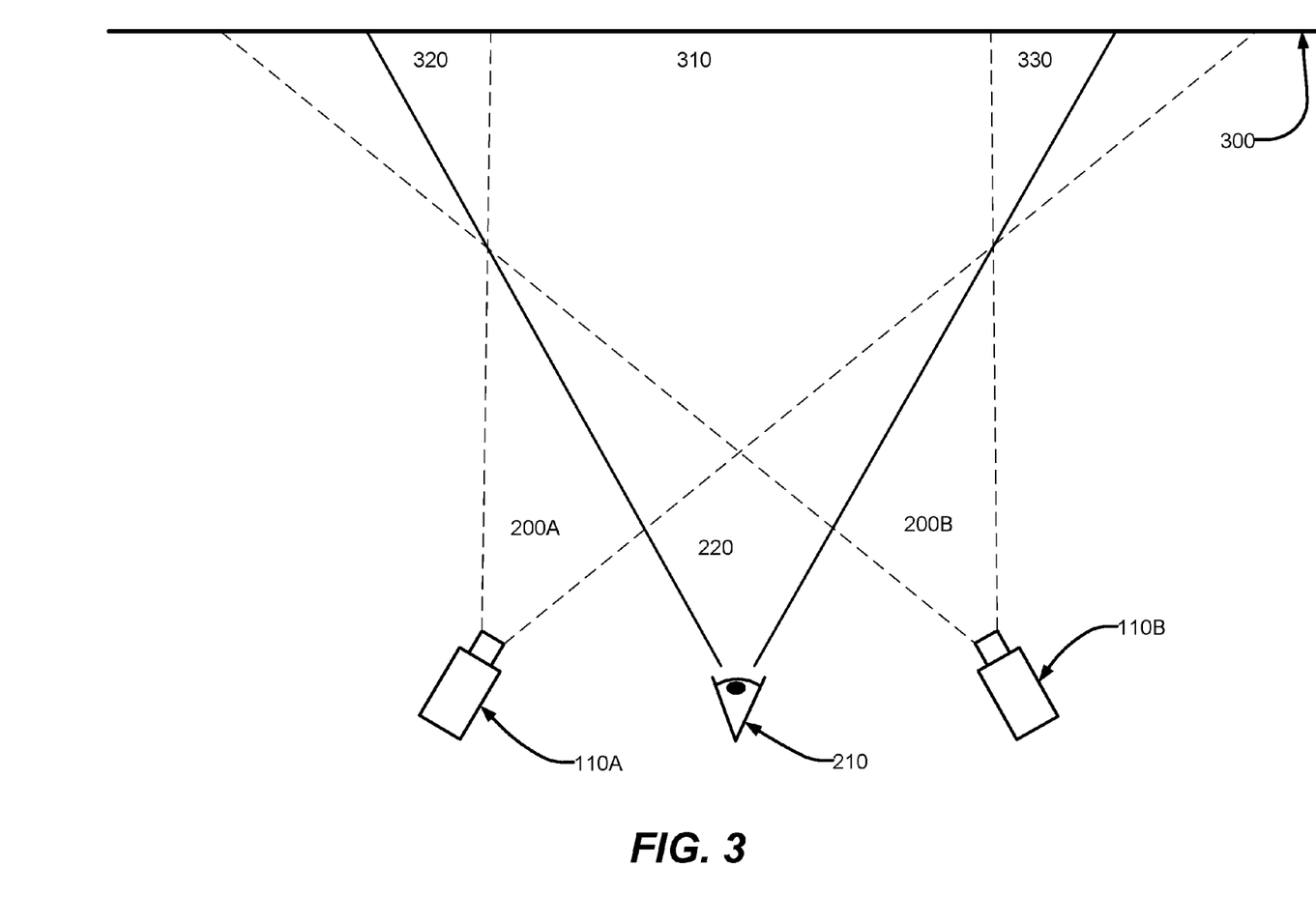
FIG. 3 illustrates a device perspective and source perspectives pointed towards the background of a live event, in accordance with some example embodiments.

Referring now to FIG. 3, it illustrates a device perspective 220 and source perspectives 200A and 200B pointed towards the background 300 of a live event, in accordance with some embodiments. The source perspectives 200A and 200B overlap at portion 310 of the background 300. Thus, for this portion of the visualization content, the content generation module 160 may simply select either source perspective 200A or source perspective 200B to generate the background of the visualization content, or may generate a linear combination of the visual content from the source perspectives 200A and 200B to generate the background of the visualization content. Portions 320 and 330 each only overlap with one source perspective, so portion 320 of the background is only generated from source perspective 200B and portion 330 of the background is only generated from source perspective 200A. Thus, the background portion of the visualization content in the device perspective 220 is the combination of portions 310, 320, and 330.

Referring back to FIG. 1, content generation module 160 may generate the foreground portion of the visualization content using a linear combination of visual content from the source perspectives that overlap with the foreground portion. The content generation module 160 may use different coefficients for the linear combination of portions of the foreground than for portions of the background. For example, since the positions and angle of direction of the device perspective can be more important for foreground portions than for background portions, source perspectives with positions and angles of direction closer to the device perspective may be weighted more highly than source perspectives with more different positions and angles of direction. In some embodiments, if only one source perspective overlaps with a foreground portion of the device perspective, the content generation module 160 generates the foreground portion based on only that one source perspective.

Figure 4:
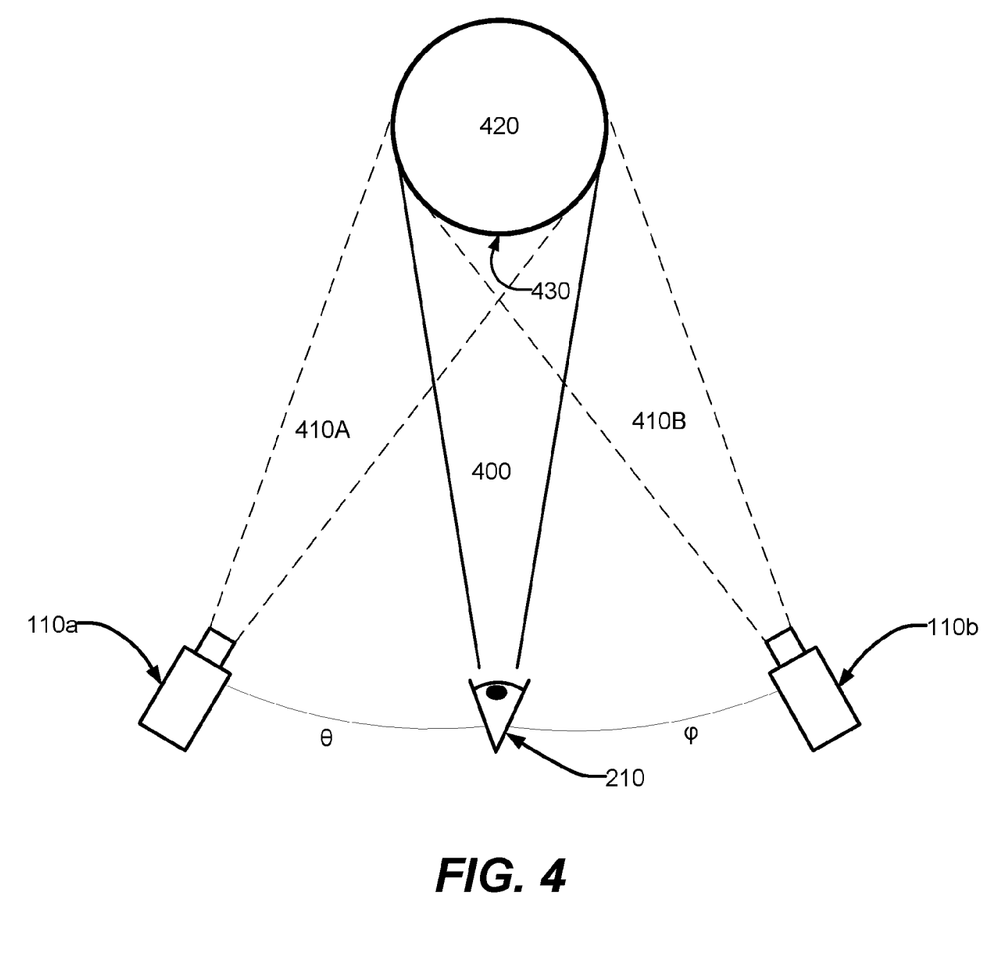
FIG. 4 illustrates a device perspective and source perspectives pointed towards a foreground object, in accordance with some example embodiments.

Turning to FIG. 4, it illustrates a device perspective 400 and source perspectives 410A and 410B pointed towards a foreground object 420, in accordance with some embodiments. The device perspective 400 and the source perspectives 410A and 410B overlap at portion 430 of the device perspective. To generate the visualization content for portion 430, the content generation module 160 can use a linear combination of the source perspectives 410A and 410B. In some embodiments, the coefficients of the linear combination of the source perspectives 410A and 410B are based on the differences in the angle of direction of the device perspective 400 and the source perspectives 410A and 410B. FIG. 4 illustrates these differences as angle $\theta$ and $\phi$, respectively.

Upon generating the visualization content, the content generation module 160 transmits the visualization content to the visualization device 100. In some embodiments, the content generation module 160 generates additional visualization content for perspectives around the device perspective so the visualization device 100 can buffer those additional perspectives in case the device perspective changes. The content generation module 160 may also process the visualization content prior to transmitting it to the visualization device. For example, the content generation module 160 may compress, encrypt, or reformat the visualization content.

The data store 170 stores data used by the content visualization system 130 to generate the visualization content for the visualization device 100. Data stored by the data store 170 can include data collected by the content collection module 140, such as visual content, device perspective data, and source perspective data. The data store 170 may also include visualization content generated by the content generation module 160.

Virtual and/or Augmented Reality Content Generation for a Live Event

Figure 5:
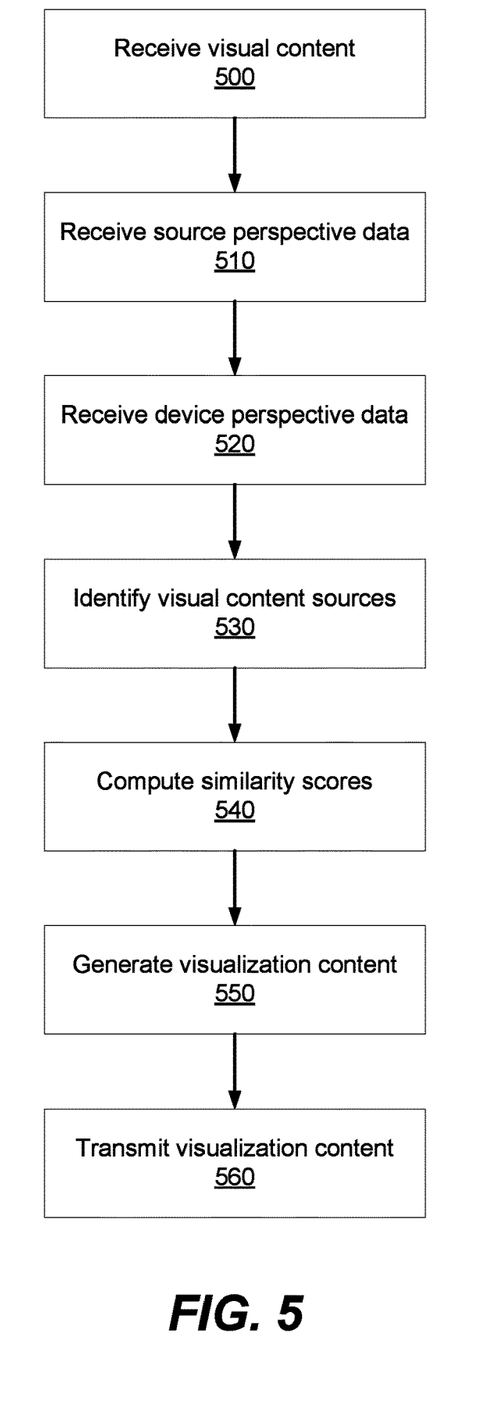
FIG. 5 is a flowchart of a method for generating VR and AR visualization content of a live event, in accordance with some example embodiments.

FIG. 5 is a flowchart of an example method for generating VR and AR visualization content of a live event, in accordance with some embodiments. Alternate embodiments may include more, fewer, or different steps from those discussed below, or may perform the steps in an order different from the one described herein.

A content visualization system receives 500 visual content of a live event from a plurality of visual content sources. Examples of live events include concerts, plays, TV shows, sports games, lectures, and speeches. The visual content can include video data, image data, and audio data. The content visualization system receives 510 source perspective data from the plurality of visual content sources. The source perspective data describes source perspectives for the plurality of visual content sources. The source perspective data can include the position of the visual content source, the angle of direction of the visual content source, the field of view of the visual content source, or the frame rate of the visual content source.

The content visualization system receives 520 device perspective data from a visualization device. The device perspective data describes the device perspective of the visualization device, which is the perspective of the live event to be presented to a user of the visualization device based on where the user is looking. The device perspective data can include the direction of the visualization device, the movement of the visualization device, the field of view of the visualization device, and the resolution of the visualization device.

The content visualization system identifies 530 one or more of the visual content sources that are associated with source perspectives that overlap with the device perspective. The content visualization identifies the visual content sources based on the device perspective data and the source perspective data. In some embodiments, the content visualization system identifies the visual content sources by generating a model of the source perspectives and the device perspectives and determining whether the source perspectives overlap with the device perspective.

The content visualization system computes 540 similarity scores for the identified visual content sources. Each similarity score for a visual content source represents the similarity of the device perspective to the source perspective corresponding to the visual content source. The similarity scores are computed based on the device perspective data and the source perspective data. The similarity scores may be computed based on the amount of overlap of the device perspective and the source perspective or differences in position and angle between the device perspective and the source perspective.

The content visualization system generates 550 visualization content for the visualization device based on the computed similarity scores and visual content from the identified one or more visual content sources. The content visualization system may use the similarity scores to determine whether to generate composited or non-composited visualization content. The content visualization system can generate composited visualization content by determining a linear combination of visual content from visual content sources with source perspectives that overlap with the device perspective. The coefficients of the linear combination may be determined based on the similarity score of the source perspective. The content visualization system can generate non-composited visualization content by designating visual content from a visual content source as the visualization content.

The content visualization system transmits 560 the generated visualization content to the visualization device. The visualization device may present the visualization content to the user upon receiving the visualization content.

Example Machine Architecture

Figure 6:
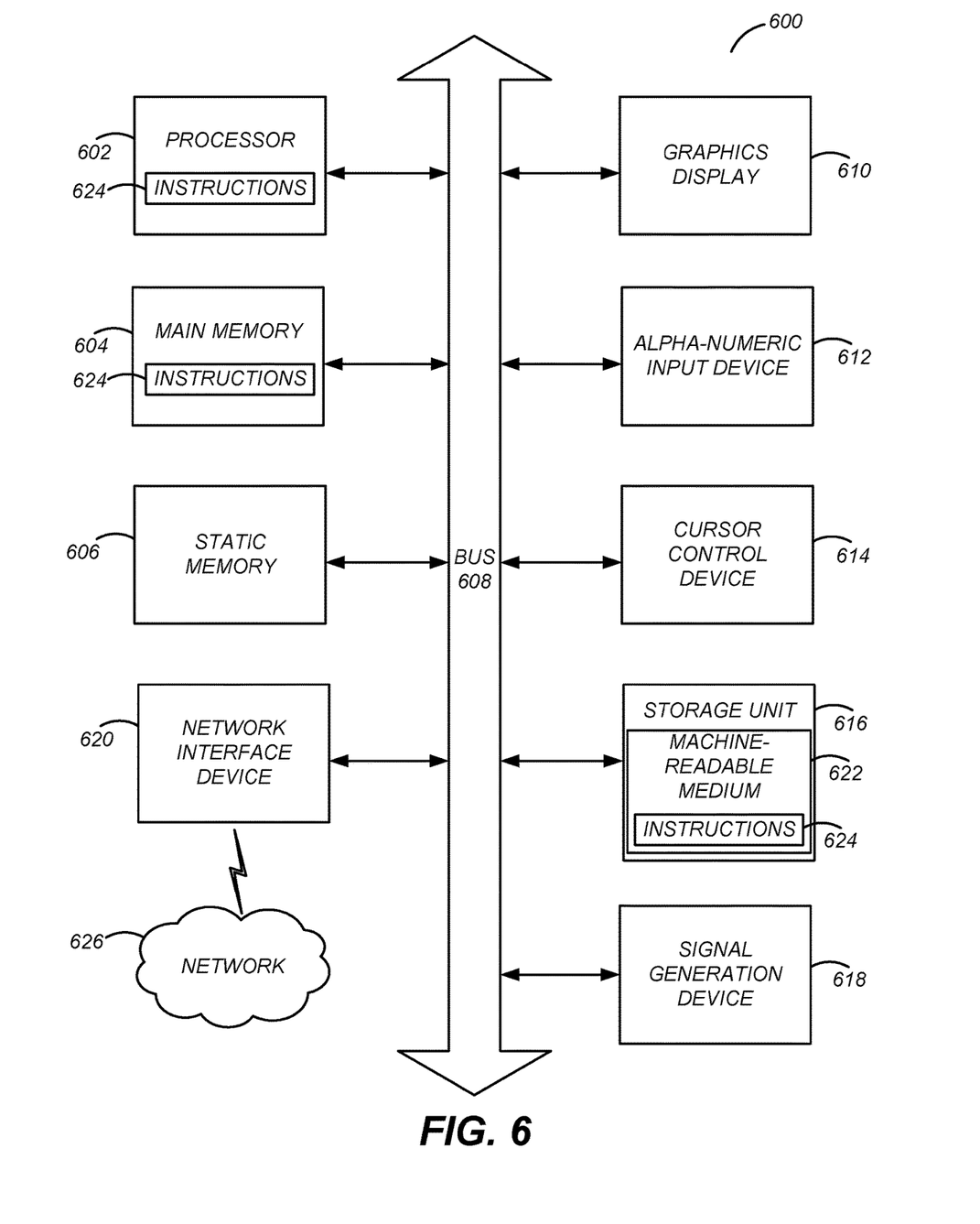
FIG. 6 is a block diagram illustrating components of an example machine able to read instructions from a machine-readable medium and execute them in a processor (or controller).

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600. The computer system 600 can be used to execute instructions 624 (e.g., program code or software) for causing the machine to perform any one or more of the methodologies (or processes) described herein. In alternative embodiments, the machine operates as a standalone device or a connected (e.g., networked) device that connects to other computer systems. In a networked deployment, the machine may operate in the capacity of a server computer system or a client computer system in a server-client network environment, or as a peer machine in a peer-to-peer (or distributed) network environment. The computer system may be configured to execute the processes described with FIGS. 1-5. The processes may be embodied as program code executable by the computer system described herein.

The machine may be a server computer, a client computer, a personal computer (PC), a tablet PC, a set-top box (STB), a smartphone, an internet of things (IoT) appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes one or more processing units (generally processor 602). The processor 602 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 600 also includes a main memory 604. The computer system may include a storage unit 616. The processor 602, memory 604, and the storage unit 616 communicate via a bus 608.

In addition, the computer system 606 can include a static memory 606, a display driver 610 (e.g., to drive a plasma display panel (PDP), a liquid crystal display (LCD), or a projector). The computer system 600 may also include alphanumeric input device 612 (e.g., a keyboard), a cursor control device 614 (e.g., a mouse, a trackball, a joystick, a motion sensor, or other pointing instrument), a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 may also reside, completely or at least partially, within the main memory 604 or within the processor 602 (e.g., within a processor's cache memory) during execution thereof by the computer system 600, the main memory 604 and the processor 602 also constituting machine-readable media. The instructions 624 may be transmitted or received over a network 626 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store the instructions 624. The term "machine-readable medium" shall also be taken to include any medium that is capable of storing instructions 624 for execution by the machine and that cause the machine to perform any one or more of the methodologies disclosed herein. The term "machine-readable medium" includes, but not be limited to, data repositories in the form of solid-state memories, optical media, and magnetic media.

Additional Considerations

The content visualization system as disclosed provides benefits and advantages that include, for example, an efficient generation of visualization content to present live content to a user through a visualization device by removing the need to render composite visualization content. Additionally, because the content visualization system can generate composite visualization content from more than one visual content source, fewer visual content sources may be necessary to provide sufficient perspectives of the live event.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1-4. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 602, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for generating visualization content of a live event through the disclosed principles herein. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation, and details of the method and apparatus disclosed herein without departing from the spirit and scope defined in the appended claims.

What is claimed is:

1. A method comprising:
   receiving visual content of a live event from a plurality of visual content sources;
   receiving source perspective data from the plurality of visual content sources, the source perspective data describing, for each visual content source of the plurality of visual content sources, a source perspective of the live event;
   receiving device perspective data from a visualization device, the device perspective data describing a device perspective of the visualization device, the device perspective being a perspective of the live event to be presented to the a user of the visualization device;

identifying one or more visual content sources of the plurality of visual content sources that are associated with a source perspective that overlaps with the device perspective, the one or more visual content sources being identified based on the source perspective data and the device perspective data;

computing one or more similarity scores for each of the identified one or more visual content sources based on the device perspective data and the source perspective data, each similarity score representing the similarity of a corresponding source perspective to the device perspective;

generating visualization content for the visualization device based on the one or more similarity scores and visual content from the identified one or more visual content sources;

wherein generating the visualization content for the visualization device comprises:
determining, based on the computed one or more similarity scores, whether to generate composite visualization content or non-composite visualization content;
generating, responsive to determining to generate the composite visualization content, the composite visualization content based on two or more of the identified one or more visual content sources; and
generating, responsive to determining to generate the non-composite visualization content, the non-composite visualization content based on exactly one of the identified one or more visual content sources; and transmitting the generated visualization content to the visualization device.

2. The method of claim 1, wherein the source perspective data comprises at least one of: GPS data, accelerometer data, electronic compass data, a field of view of a visual content source, a frame rate of a visual content source, and a resolution of a visual content source.

3. The method of claim 1, wherein the device perspective data comprises at least one of: GPS data, accelerometer data, electronic compass data, a field of view of the visualization device, a frame rate of the visualization device, and a resolution of the visualization device.

4. The method of claim 1, wherein the visual content comprises at least one of video data, image data, and audio data.

5. The method of claim 1, wherein identifying the one or more visual content sources that are associated with the source perspective that overlaps with the device perspective further comprises generating a model of the device perspective and the source perspectives of the plurality of visual content sources.

6. The method of claim 1, wherein the one or more similarity scores are computed based on amounts of overlap of the corresponding source perspectives with the device perspective.

7. The method of claim 1, wherein the one or more similarity scores are computed based on differences in angle of direction of the corresponding source perspectives from the device perspective.

8. The method of claim 1, wherein the one or more similarity scores are computed based on differences in position of the corresponding source perspectives from the device perspective.

9. The method of claim 1, wherein determining whether to generate the composite visualization content or the non-composite visualization content comprises comparing the one or more similarity scores to a similarity score threshold.

10. The method of claim 1, wherein generating the non-composite visualization content comprises:
identifying a visual content source with a highest similarity score of the one or more similarity scores; and
generating the non-composite visualization content based on visual content from the identified visual content source.

11. The method of claim 1, wherein generating the composite visualization content comprises generating a linear combination of visual content from two or more of the identified one or more visual content sources.

12. A computer program product comprising a non-transitory computer-readable storage medium comprising instructions encoded thereon that, when executed by a processor, causes the processor to:
receive visual content of a live event from a plurality of visual content sources;
receive source perspective data from the plurality of visual content sources, the source perspective data describing, for each visual content source of the plurality of visual content sources, a source perspective of the live event;
receive device perspective data from a visualization device, the device perspective data describing a device perspective of the visualization device, the device perspective being a perspective of the live event to be presented to the a user of the visualization device;
identify one or more visual content sources of the plurality of visual content sources that are associated with a source perspective that overlaps with the device perspective, the one or more visual content sources being identified based on the source perspective data and the device perspective data;
compute one or more similarity scores for each of the identified one or more visual content sources based on the device perspective data and the source perspective data, each similarity score representing the similarity of a corresponding source perspective to the device perspective;
generate visualization content for the visualization device based on the one or more similarity scores and visual content from the identified one or more visual content sources;
wherein the instructions to generate the visualization content for the visualization device further comprises instructions that when executed causes the processor to:
determine, based on the computed one or more similarity scores, whether to generate composite visualization content or non-composite visualization content;
generate, responsive to determining to generate the composite visualization content, the composite visualization content based on two or more of the identified one or more visual content sources; and
generate, responsive to determining to generate the non-composite visualization content, the non-composite visualization content based on exactly one of the identified one or more visual content sources; and
transmit the generated visualization content to the visualization device.

13. The computer program product of claim 12, wherein the source perspective data comprises at least one of: GPS data, accelerometer data, electronic compass data, a field of view of a visual content source, a frame rate of a visual content source, and a resolution of a visual content source.

14. The computer program product of claim 12, wherein the device perspective data comprises at least one of: GPS data, accelerometer data, electronic compass data, a field of view of the visualization device, a frame rate of the visualization device, and a resolution of the visualization device.

15. The computer program product of claim 12, wherein the one or more similarity scores are computed based on amounts of overlap of the corresponding source perspectives with the device perspective.

16. The computer program product of claim 12, wherein the instructions to determine whether to generate the composite visualization content or the non-composite visualization content further comprises instructions that when executed causes the processor to compare the one or more similarity scores to a similarity score threshold.

17. The computer program product of claim 12, wherein the instructions to generate the non-composite visualization content further comprises instructions that when executed causes the processor to:
   identify a visual content source with a highest similarity score of the one or more similarity scores; and
   generate the non-composite visualization content based on visual content from the identified visual content source.

18. The computer program product of claim 12, wherein the instructions to generate the composite visualization content further comprises instructions that when executed causes the processor to generate a linear combination of visual content from two or more of the identified one or more visual content sources.

* * * * *